United States Patent [19]

Mickelson

[11] Patent Number: 4,633,360

[45] Date of Patent: Dec. 30, 1986

[54] STATION PROTECTOR

[75] Inventor: Nils P. Mickelson, Raymond, Me.

[73] Assignee: GTE Products Corporation, Stamford, Conn.

[21] Appl. No.: 664,111

[22] Filed: May 17, 1984

Related U.S. Application Data

[63] Continuation-in-part of Ser. No. 461,765, Jan. 28, 1983, abandoned.

[51] Int. Cl.[4] .......................... H02H 3/22; H02H 9/06

[52] U.S. Cl. .................................... 361/119; 361/124; 337/32

[58] Field of Search ......................... 361/124, 117–120, 361/56; 337/28, 29, 32–34; 179/91 R, 98

[56] References Cited

U.S. PATENT DOCUMENTS 2,724,793 11/1955 Fisher .................................. 361/124
3,886,408 5/1975 Klayum et al. ................. 361/119 X
4,086,648 4/1978 Hines et al. ......................... 361/124
4,132,915 1/1979 Wilms ............................. 361/124 X
4,159,500 6/1979 Baumbach et al. ............. 361/124 X
4,351,015 9/1982 Smith .............................. 361/124 X
4,380,038 4/1983 Roudeau ............................ 361/119
4,447,848 5/1984 Smith ................................. 361/120

*Primary Examiner*—A. D. Pellinen
*Assistant Examiner*—T. DeBoer
*Attorney, Agent, or Firm*—James Theodosopoulos

[57] ABSTRACT

A station protector for communication lines includes an electrical conductor formed for connection to the communications lines and affixed to a base member, a grounding means affixed to the base member, an arrester cartridge disposed in an aperture in the base member and a biased resilient member electrically coupling the electrical conductor to a surge voltage arrester or to circuit ground in the absence of the arrester.

5 Claims, 3 Drawing Figures

STATION PROTECTOR

This application is a continuation-in-part of Ser. No. 461,765, filed Jan. 28. 1983 now abandoned.

This application concerns station protectors for communication lines. Examples of such protectors are shown in U.S. Pat. Nos. 4,405,967, 4,351,015, 4,340,923, 4,241,374, 4,208,694, 4,158,869, 4,142,220, 4,132,915, 4,104,693, 4,013,927, 4,002,952, 3,993,933, 3,989,973, 3,979,646, 3,755,715 and 3,310,712.

Such protectors comprise an insulating block having a well in which an arrester cartridge is inserted. The arrester cartridge comprises a cylindrical metal shell, threaded near the top, having a hexagonal nut at the top. An arrester, such as a gas tube or carbon air-gap, is disposed in the shell and there is a cage, encircling the arrester, disposed between the arrester and the shell.

It occasionally happens that a defective arrester will be removed from the protector and, because no immediate replacement is at hand, the shell will be threaded back into the block without an arrester and cage. In such a case, of course, the protector provides no protection. The problem is that the unprotected circuit remains functional and that external examination of the protector does not indicate absence of an arrester. It is a purpose of this invention to solve the problem by shorting out the circuit to be protected until the arrester is replaced.

This invention provides a cantilever spring that shorts the circuit to ground if the arrester is absent. When the arrester is present, the cantilever spring maintains a steady frictionless force on the tip of the arrester by pressing thereon in a direction substantially axial to the arrester. Such frictionless force is advantageous over a slidable frictional type force, such as that between a cage and a shell, because such a frictional force can increase with time due to fretting or corrosion so that the parts are no longer freely slidable. In these circumstances, after a period of cooling and warming as may be caused by the weather, a gap may form between the arrester and the line terminal, thereby decreasing protection.

Figure 1:
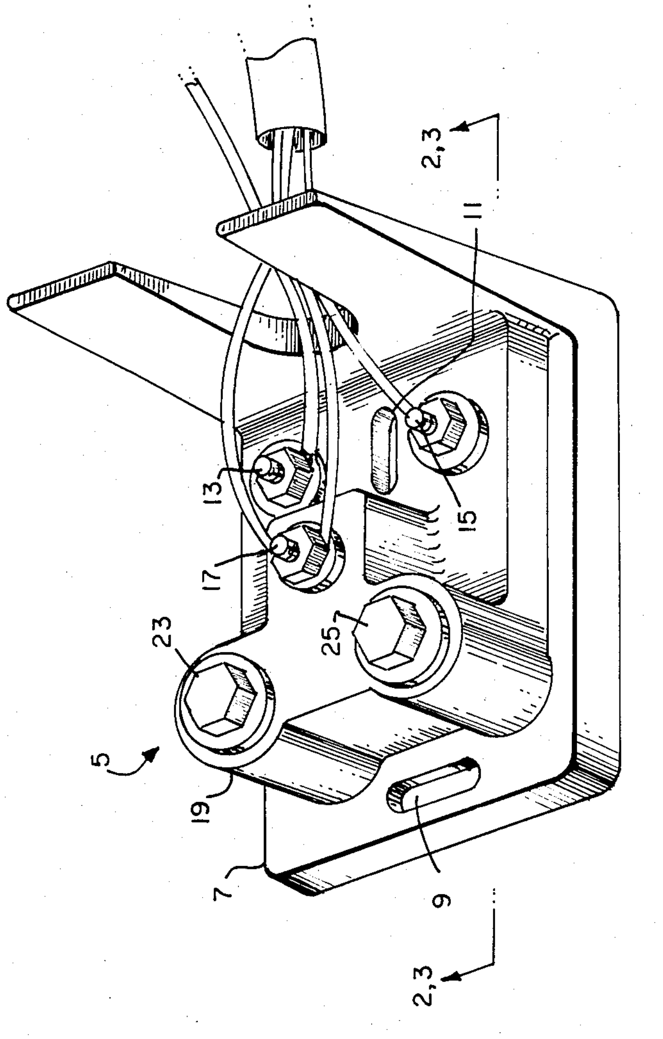
FIG. 1 is a perspective view of a station protector without a cover.

In one embodiment, as shown in the drawing, a station protector 5 has a block or base member 7 of an electrical insulator material such as phenolic plastic for example. Base member 7 includes a pair of elongated slots 9 and 11 which extend in a direction normal to one another and are formed for adjustable attachment of base member 7 to a support member (not shown), such as a building or pole.

A pair of line terminals or posts 13 and 15 are affixed to base member 7 either by a molding arrangement or preferably by attachment after base portion 7 has been fabricated. Each of posts 13 and 15 is connectable to one of a pair of communications lines which is in turn, connectable to an energy source and to a remotely located instrument such as a telephone or computer terminal.

A grounding means 17, which may be in the form of an electrically conducting post, is affixed to base member 7 in a manner similar to the above-described posts 13 and 15 and is, in turn, connectable to a circuit ground. Also, base member 7 includes a pair of wells or apertured members 19 and 21 each formed to receive an arrester cartridge, 23 and 25 respectively. Moreover, station protector 5 is formed for attachment of a cover member (not shown) to base member 7 to provide for enclosure of electrical conductors 13 and 15, grounding means 17 and arrester cartridges 23 and 25.

Figure 2:
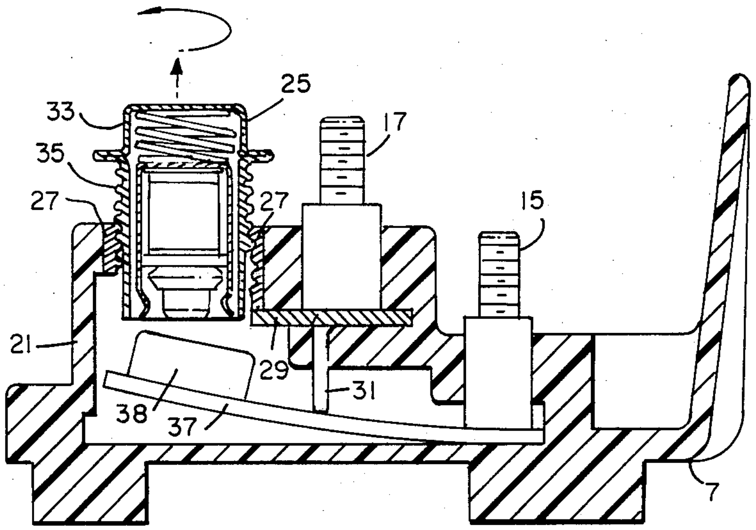
FIG. 2 is a cross-sectional view of the station protector showing the protector configuration prior to insertion of an arrester cartridge.

As can more readily be seen in the cross-sectional view of FIG. 2, apertured member 21 includes a threaded metal member 27 therein which is electrically and mechanically coupled to grounding means 17 by way of a structural metal member 29. Also, structural metal member 29 includes a downwardly extending portion or rod 31. A threaded tubular housing member or shell 33 of arrester cartridge 25 is screwed into threaded metal member 27. Arrester cartridge 25 includes an arrester 35, for example, a sealed cold cathode gas tube or a carbon air gap, and a cage 39 and can include a secondary arc gap and a fusible pellet, all of which are, when in place, in electrcal contact with shell 33.

Electrical conductor 15 has a resilient electrically conductive member or spring 37 connected thereto with a contact member 38 at the opposite end thereof extending into apertured member 21. Spring 37 is biased to contact downwardly extending portion 31 of structural metal member 29 whenever arrester cartridge 25 is absent or withdrawn from apertured member 21. Spring 37 is a substantially flat, cantilever spring fixed at the end opposite arrester assembly 25 and is substantially orthogonal therewith, as well as with rod 31, in order to provide frictionless contact.

Figure 3:
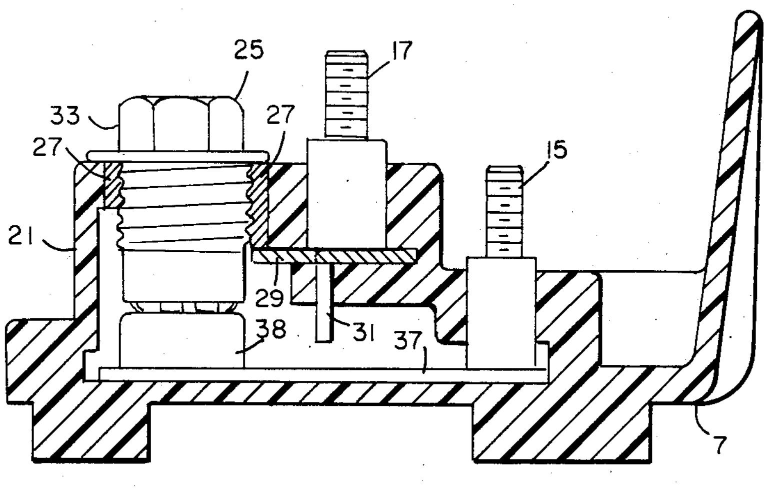
FIG. 3 is a cross-sectional view of the station protector with the arrester cartridge in operational position.

As shown in FIG. 3, a properly inserted arrester cartridge 25 exerts a frictionless force on spring 37 such that contact between spring 37 and rod 31 is interrupted or discontinued while electrical connection from electrical conductor 15 to arrester cartridge 25 is provided.

Thus, spring 37 provides capability for disconnecting line terminal 15 from ground 17 and connecting line terminal 15 to arrester cartridge 25 whenever arrester cartridge 25 is properly positioned within station protector 5. However, with arrester 35 and cage 39 absent, even if shell 33 is threaded into member 27, spring 37 is biased upwards and makes contact with rod 31, thereby grounding line terminal 15 and rendering its circuit inoperative. Rod 31 is substantially parallel to the axis of gas tube 35 so that the force of spring 37 on rod 31 will be substantially frictionless, for the reason previously mentioned.

What is claimed is:

1. A station protector comprising:

a base member of electrical insulator material;

mounting means formed in said member mounting an arrester cartridge comprising a threaded metal shell, an arrester and a cage;

grounding means affixed to said base member and fromed to connect to a circuit ground and to said arrester cartridge;

a line terminal affixed to said base member and formed to connect to a circuit; and an electrically conductive cantilever spring formed to ground the line terminal to the grounding means in the absence of the arrester, cage and shell, and to connect the line terminal to the arrester cartridge when the complete arrester cartridge is properly mounted in the mounting means.

2. The station protector of claim 1 wherein the spring makes substantially frictionless contact with the arrester cartridge when said cartridge is properly mounted.

3. The station protector of claim 1 wherein the spring is substantially flat and is substantially orthogonal to the axis of the arrester.

4. The station protector of claim 1 wherein a rod is connected to the grounding means and wherein the spring grounds the line terminal by making contact with the rod.

5. The station protector of claim 4 wherein the rod is substantially orthogonal to the spring so that the contact therebetween is substantially frictionless.

* * * * *